(12) United States Patent
Smith et al.

(10) Patent No.: US 6,704,408 B2
(45) Date of Patent: Mar. 9, 2004

(54) METHOD AND SYSTEM FOR CONNECTING A WIRELINE TELEPHONE TO A WIRELINE SWITCH IN A WIRELINE TELECOMMUNICATIONS NETWORK

(75) Inventors: Dennis C. Smith, Longmont, CO (US); Don E. Gillespie, Boulder, CO (US); Gary R. Duffy, Littleton, CO (US); Charles I. Cook, Louisville, CO (US)

(73) Assignee: Qwest Communications International Inc., Denver, CO (US)

( * ) Notice: Subject to any disclaimer, the term of this patent is extended or adjusted under 35 U.S.C. 154(b) by 79 days.

(21) Appl. No.: 09/887,883

(22) Filed: Jun. 22, 2001

(65) Prior Publication Data

US 2002/0071544 A1 Jun. 13, 2002

Related U.S. Application Data

(63) Continuation of application No. 09/218,328, filed on Dec. 22, 1998, now abandoned.

(51) Int. Cl.⁷ .............................. H04M 1/64; H04M 3/00
(52) U.S. Cl. ................. 379/242; 379/88.17; 379/88.18; 379/219; 379/221.01; 379/265.01; 379/243
(58) Field of Search .......................... 379/88.13, 88.17, 379/88.18, 219, 220.01, 221.01, 221.08, 221.09, 265.01, 265.02, 333, 242, 243, 399.01

(56) References Cited

U.S. PATENT DOCUMENTS

| | | | |
|---|---|---|---|
| 5,068,892 A | | 11/1991 | Livanos |
| 5,287,344 A | * | 2/1994 | Bye et al. ..................... 370/16 |
| 5,475,749 A | | 12/1995 | Akinpelu et al. |
| 5,563,938 A | | 10/1996 | Soshea et al. |
| 5,563,939 A | | 10/1996 | La Porta et al. |
| 5,574,783 A | | 11/1996 | Dunn |
| 5,583,920 A | * | 12/1996 | Wheeler, Jr. ................. 379/88 |
| 5,590,176 A | * | 12/1996 | Agarwal et al. .............. 379/59 |
| 5,592,477 A | | 1/1997 | Farris et al. |
| 5,615,254 A | | 3/1997 | Qiu et al. |
| 5,635,980 A | | 6/1997 | Lin et al. |
| 5,784,449 A | | 7/1998 | Ardon |
| 5,835,583 A | | 11/1998 | Hetz et al. |
| 5,970,130 A | * | 10/1999 | Katko ......................... 379/201 |
| 6,038,227 A | | 3/2000 | Farris et al. |
| 6,055,232 A | | 4/2000 | Ward et al. |
| 6,069,949 A | * | 5/2000 | Schuenhoff et al. ......... 379/242 |
| 6,480,487 B1 | * | 11/2002 | Wegleitner et al. ......... 370/354 |

* cited by examiner

*Primary Examiner*—Allan Hoosain
(74) *Attorney, Agent, or Firm*—Brooks Kushman P.C.

(57) ABSTRACT

A method and system for connecting a wireline telephone to a wireline switch in a wireline telecommunications network having a plurality of remote terminals and wireline switches includes a processing platform having a database associated therewith. The processing platform is operative to receive identification of a subscriber in response to a call attempt and determine a preferred connection between the wireline telephone and one of the plurality of wireline switches based on predetermined data stored in the database and associated with the subscriber. The remote terminal connects the wireline telephone to one of the plurality of wireline switches based on the preferred connection as directed by the processing platform so as to complete the call attempt.

13 Claims, 3 Drawing Sheets

METHOD AND SYSTEM FOR CONNECTING A WIRELINE TELEPHONE TO A WIRELINE SWITCH IN A WIRELINE TELECOMMUNICATIONS NETWORK

CROSS-REFERENCE TO RELATED APPLICATIONS

This application is a continuation of U.S. application Ser. No. 09/218,328 filed Dec. 22, 1998 now abandoned which is incorporated in its entirety by reference herein.

TECHNICAL FIELD

This invention relates to methods and systems for dynamically assigning interface directory numbers in a wireline network.

1. Background Art

Current wireline telecommunications networks provide a static mapping of wireline access to network elements. This static mapping limits the ability of the network to adjust to changing conditions including traffic load, service mix, time and seasonal changes, etc. In addition, static access arrangements inhibit the Local Exchange Carrier from providing enhanced services to subscribers unless the serving Class 5 office equipment is augmented or replaced at considerable expense to the service provider. While many subscribers of telephone service require only basic POTS (Plain Old Telephone Service) arrangements, many subscribers desire more enhanced capabilities. These enhanced capabilities typically impact the Class 5 offices in the serving Area. This arrangement also inhibits the dynamic access of multiple service providers with minimal configuration changes.

Thus, a need exists for allowing a Class 5 switch to easily have enhanced capabilities including dynamic access to each of the switches so as not to require a subscriber to be permanently associated with any particular switch.

2. Disclosure of Invention

It is thus a general object of the present invention to provide a method and system for dynamically assigning interface directory numbers in a wireline network.

It is another object of the present invention to provide a method and system for allocating traffic load across multiple wireline switches so as to not overload any given wireline switch.

In carrying out the above object and other objects, features, and advantages of the present invention, a method is provided for connecting a wireline telephone to a wireline switch in a wireline telecommunications network having a plurality of remote terminals and wireline switches. The method includes receiving identification of a subscriber in response to a call attempt, determining a preferred connection between the wireline telephone and one of the plurality of wireline switches based on predetermined data associated with the subscriber, and connecting the wireline telephone to one of the plurality of wireline switches based on the preferred connection so as to complete the call attempt.

In further carrying out the above object and other objects, features, and advantages of the present invention, a system is also provided for carrying out the steps of the above described method. The system includes a processing platform operative to receive identification of a subscriber in response to a call attempt and determine a preferred connection between the wireline telephone and one of the plurality of wireline switches based on predetermined data associated with the subscriber. The remote terminal is operative to connect the wireline telephone to one of the plurality of wireline switches based on the preferred connection as directed by the processing platform so as to complete the call attempt.

BEST MODE FOR CARRYING OUT THE INVENTION

Figure 1:
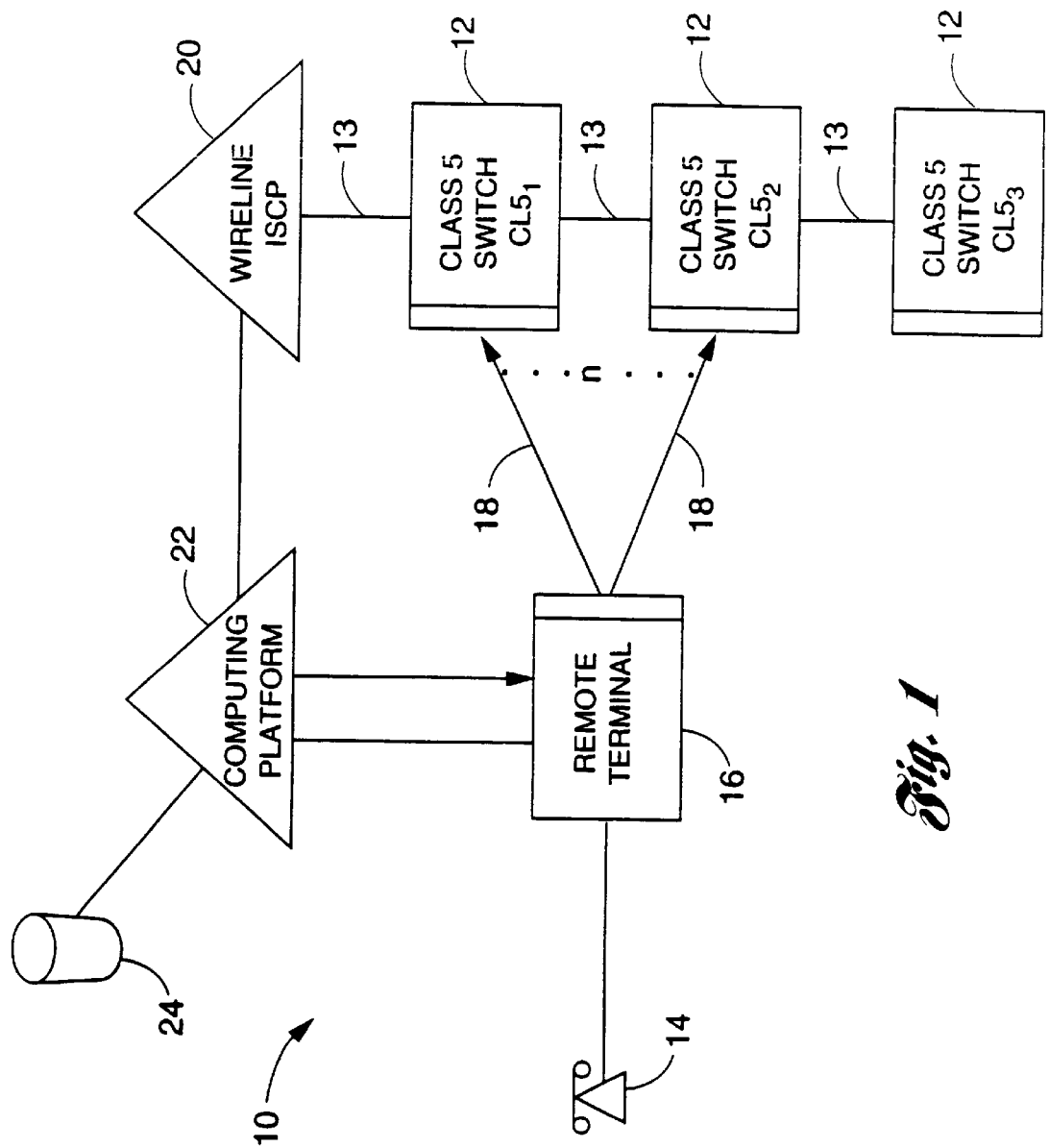
FIG. 1 is a schematic diagram of a wireline telecommunications network employing the teachings of the present invention.

Turning now to FIG. 1, there is shown a schematic diagram of a wireline telecommunications network employing the teachings of the present invention, denoted generally by reference numeral 10. The wireline telecommunications network comprises a plurality of wireline switches 12, such as Class 5 (CL5) switches, and wireline telephones 14 (only one of which is shown). These switches 12 are typically owned and operated by the Local Exchange Carrier (LEC).

Each of the switches 12 have a plurality of physical ports (not shown) that are referred to as interface Directory Numbers (iDNs) since they are essentially telephone numbers (lines) provisioned on the Class 5 switches 12. These lines are grouped into Feature Groups (FGs) based on the services that are provisioned in the respective switch 12, such as call-waiting, three-way calling, etc. The switches 12 are also connected among each other via transmission circuits 13 so that interoffice trunking between the switches 12 is possible. Furthermore, the wireline network includes an Intelligent Service Control Point (ISCP) 20 coupled to at least one of the switches 12.

The switches 12 are connected to wireline telephone 14 via a remote terminal 16 and wireline interfaces 18. Wireline interfaces 18 are digital loop carrier system interfaces that conform to the TR-NWT-000303 technical requirements for digital loop carrier systems published by Bell Communications Research.

Finally, the system 10 of the present invention includes a processing platform 22 having a database 24 and being in communication with ISCP 20 and remote terminal 16. Processing platform 22 controls selection of a wireline switch 12 based on various data stored in database 24. Rather than have remote terminal 16 arbitrarily select a circuit to one of the switches 12, processing platform 22 provides specific parameters directing the remote terminal 16 to select a specific switch 12 and port from a specific group of the ports based on predetermined parameters.

The primary objectives achieved by the processing platform include: 1) assigning an originating call to the switch 12 where a subscriber's wireline services are provisioned when that switch 12 is equipped with a wireline interface 18 to remote terminal 16; 2) reducing the interoffice trunking requirement between switches 12 for call delivery scenarios; and 3) allocating the traffic load across multiple switches 12.

Database 24 contains profile information for each subscriber such as the Central Office Identification (COid) of the switch 12 serving the subscriber and the Feature Group Identification (FGid) of the features subscribed to by the subscriber. An exemplary subscriber profile that may be stored in database 24 is exemplified in FIG. 2. Thus, processing platform 22 knows which switch 12 serves the subscriber's wireline location (i.e., the subscriber's "home" switch), based on the COid in the profile data, and assigns the call to a Feature Group pool associated with the home switch 12 when possible. Preferably, each Feature Group in each serving switch 12 has common features assigned. That is, Feature Group 1 in all switches 12 will have the same features, e.g., call waiting and call forwarding, regardless of which switch 12 the particular call is assigned. This way the subscriber profile will only need to maintain data as to which Feature Group and home switch 12 the subscriber is associated with.

Figures 2, 3:
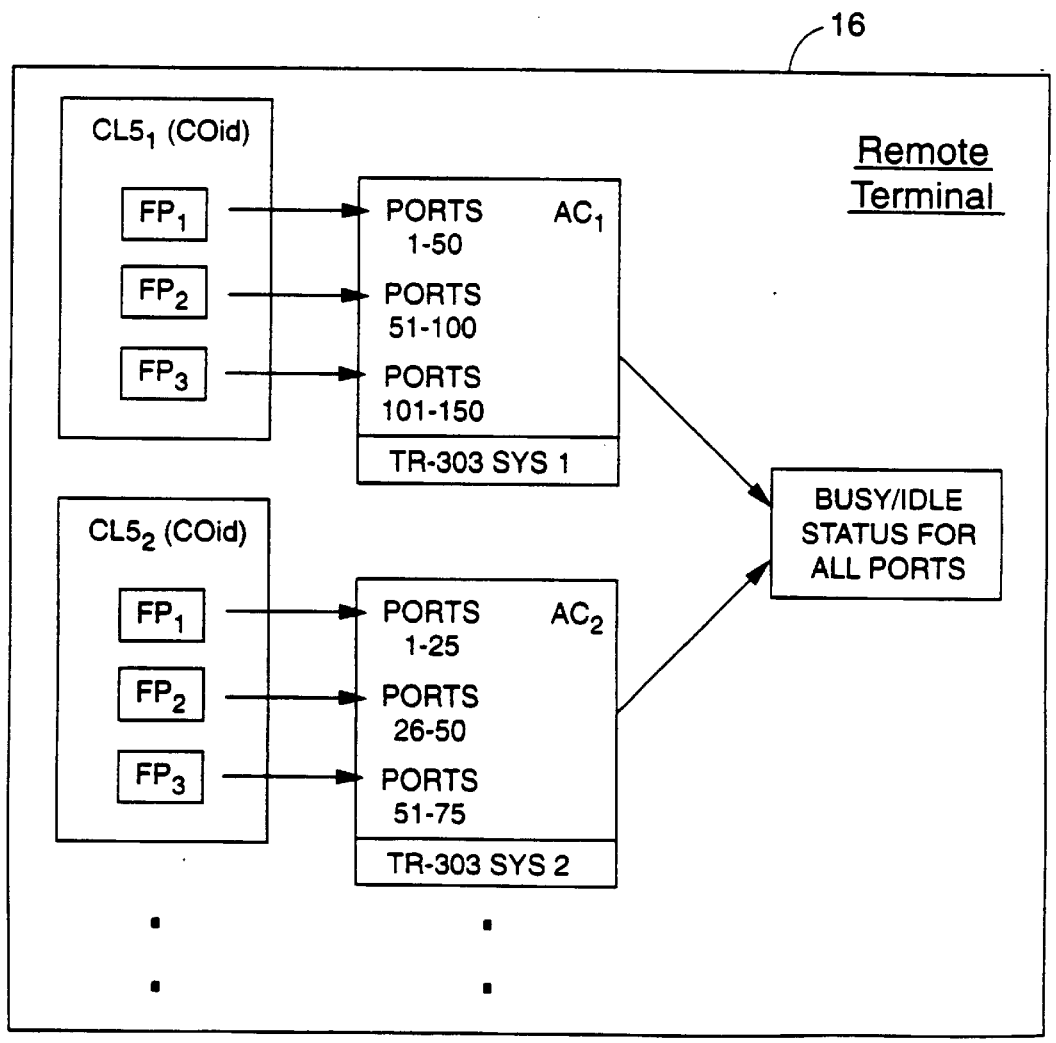
FIG. 2 is a block diagram illustrating a subscriber profile stored at a remote database.
FIG. 3 is a block diagram illustrating the relationship between the wireline switches and Feature Groups as mapped in the remote terminal.

Processing platform 22 effectively instructs remote terminal 16 to route the call over a specific wireline interface 18 and, as such, to a specific serving switch 12. However, the remote terminal 16 is responsible for selecting an idle port that satisfies these conditions. In accomplishing this, remote terminal 16 maintains the real time Busy/Idle status of the ports with a Feature Group on a call-by-call basis, as shown in FIG. 3. The application in the remote terminal 16 contains a mapping of individual switches 12 and Feature Groups to actual ports in the remote terminal 16 along with the immediate Busy/Idle status of all the ports associated with the particular remote terminal 16. However, the actual implementation does not require the port assignments to be sequential as shown in FIG. 3. The remote terminal 16, thus, selects an idle port from the group of ports that satisfies the request/instruction from processing platform 22.

Figure 4:
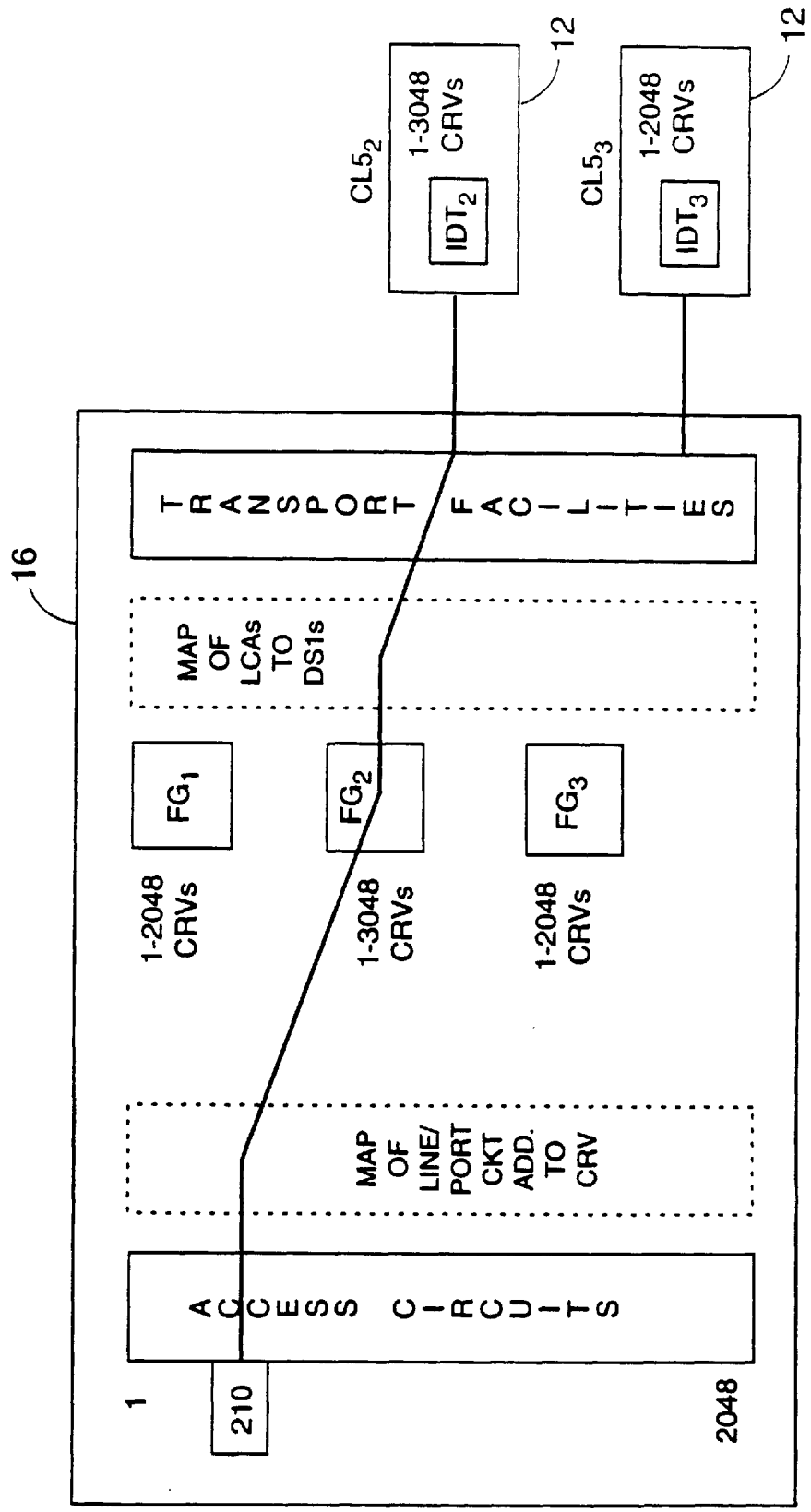
FIG. 4 is a block diagram illustrating the mapping relationship between the physical ports and the Feature Group ports in any given remote terminal.

The mapping of the port addresses to an appropriate Call Reference Value (CRV) of the associated Feature Group and the mapping of the port addresses to the appropriate DS 1 is provisioned at the discretion of the service provider. FIG. 4 illustrates a view of how the physical port appearances are mapped to the appropriate CRV and the appropriate DS 1 in order to appear as a call with the correct features on the correct Serving Class 5 switch 12. Thus, FIG. 4 is illustrative of the subscriber being subscribed to Feature Group 2 and for the current call is assigned to physical port #210 associated with serving Class 5 switch #2.

The CRV is an internal identifier used within a typical TR-303 implementation and the corresponding wireline switch 12 to identify the number of the port being used for a particular call. For example, in FIG. 4 port #210 is "cross-connected" to a CRV. Whenever a call is connected to port #210 the switch 12 will use the CRV as a way of identifying all the messages that go across the wireline interface 26 relevant to this port. In the processing platform 22, the port is identified by a regular telephone number. A DS1 is a digital facility consisting of 24 DSOs (64 kbps) voice channels.

In a call delivery scenario, i.e., a call to the wireline telephone 14, incoming calls to the telephone 14 will be assigned a port that resides on the subscriber's wireline, or home, switch 12 if possible so as to avoid an interoffice trunk connection to another switch 12. For example, if the subscriber's home switch 12 is $CL5_1$, as shown in FIG. 1, and the processing platform 22 assigns a call to a Feature Group on $CL5_3$, an interoffice trunk connection between $CL5_1$ and $CL5_3$ will be required to deliver the call to the remote terminal 16 serving the wireline telephone 14. If, however, the home switch 12 does not connect to the remote terminal 16 serving the wireline telephone 14, then an interoffice connection cannot be avoided. In this case, processing platform 22 assigns the call to a switch 12 based on other predetermined data, such as time of day, day of week, predetermined traffic loads, etc. As such, the application in the processing platform 22 is required to maintain in its data a log of the number of active calls assigned to any given switch 12 associated with the remote terminals 16 in its universe. The identification of the switch 12 (i.e., COid) which as assigned the call is returned to the processing platform 22 from the remote terminal 16 and is updated when the call is released and a call released message is sent by the remote terminal 16 to the processing platform 22.

In order to initiate operation of processing platform 22, the switch 12 receiving the incoming call performs a digit analysis and determines it must query the ISCP 20. This is done by setting a "trigger" in the switch 12, in software and applications, that instructs the switch 12 to go to the ISCP 20 for instructions when someone attempts to terminate a call to a particular number. The ISCP 20 in turn queries the processing platform 22 to request a port assignment. The processing platform 22 assigns the call to the home switch 12, if possible, and a Feature Group associated with the home switch 12 based on the subscriber's profile as shown in FIG. 2.

This assignment is sent to remote terminal 16, which then assigns a specific port from the Feature Group for the call based on the Busy/Idle status of each of the ports in the Feature Group. Remote terminal 16 then returns this information to the processing platform 22, which in turn transfers this information to ISCP 20 for instructing the switch 12 which IDN port to route the call. The switch 12 then sends the call to the remote terminal 16 via the appropriate IDN.

If the remote terminal 16 cannot satisfy the request for a primary route (i.e., access associated with a Feature Group to the selected switch 12 is unavailable), the processing platform 22 will designate an alternate route multiple times. In a preferred embodiment, eight retries can be performed, either by eight retries, or by the processing platform 22 including the eight possible route options in a single response message. The preferred embodiment is for the processing platform 22 to provide a series of values to the remote terminal 16. It will then be the responsibility of the service provider's traffic engineering group to determine the desired priority switch 12 to be identified in the message parameter when requesting a port assignment by the remote terminal 16 and provision that data in the subscriber's profile to be utilized by the port management applications in the processing platform 22.

A call origination scenario is processed in a manner similar to that of the call delivery scenario. The wireline telephone 14 signals the remote terminal 16 that a call is being made. The remote terminal 16 queries the processing platform 22 for instructions as to which Feature Group and switch 12 to select. Upon receiving this information, remote terminal 16 connects the resulting call to a port, from the available corresponding Feature Group ports, to a switch 12 connected to the remote terminal 16. Thus, a call can be originated from any Class 5 switch 12 connected to the serving remote terminal 16 since an originating call does not require functionality in the home switch.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. A system for connecting a subscriber wireline telephone comprising:
   a plurality of telecommunication switches, each switch having a plurality of ports grouped into one of a plurality of wireline telephone feature groups based on services provisioned in the switch;
   a database indicating a subscriber feature group as one of the feature groups having features subscribed to by the subscriber;
   a processing platform in communication with the database, the processing platform determining the subscriber feature group based on a subscriber identification number; and
   a remote terminal in communication with the wireline telephone, the processing platform and the switches, the remote terminal operative to connect the subscriber wireline telephone to a switch port based on the subscriber wireline telephone feature group and the port grouping.

2. A system for connecting a subscriber wireline telephone as in claim 1 further comprising an intelligent service control point in communication with the processing platform and the switches, the intelligent service control point querying the processing platform for a switch port assignment when a call destined for the wireline telephone is received by a switch.

3. A system for connecting a subscriber wireline telephone as in claim 2 wherein the database further indicates a home switch for the wireline telephone, the processing platform assigning the call to the wireline telephone home switch if the home switch is available.

4. A method of switching a call from a subscriber wireline telephone comprising:
   grouping a subset of ports in each switch of a plurality of switches based on subscriber wireline telephone features implemented in the switch;
   receiving the call from the subscriber wireline telephone at a remote terminal, the call including a subscriber identification;
   determining a subscriber feature group based on the subscriber identification, the subscriber feature group representing wireline telephone features subscribed to by the subscriber;
   determining one of the switch ports supporting the subscriber feature group; and
   switching the received call from the remote terminal to the determined switch port.

5. A method of switching a call from a subscriber wireline telephone as in claim 4 wherein determining the subscriber feature group comprises:
   receiving the subscriber identification at a processing platform in communication with the remote terminal;
   accessing a database in communication with the processing platform to determine the subscriber feature group; and
   sending an indication of the subscriber feature group to the remote terminal.

6. A method of switching a subscriber wireline telephone call comprising:
   grouping ports in each of a plurality of switches into one of a plurality of groups, each group representing one set of subscriber wireline telephone selectable features implemented in the switch, each port connected to a remote terminal servicing the wireline telephone;
   receiving the call, the call including a subscriber identification;
   determining a subscriber wireline telephone feature group based on the subscriber identification;
   determining a switch port in the switch supporting the subscriber wireline telephone feature group; and
   switching the call between the switch and the remote terminal through the determined switch port.

7. A method of switching a subscriber wireline telephone call as in claim 6 wherein determining the subscriber feature group comprises:
   receiving the subscriber identification at a processing platform in communication with the switch;
   accessing a database in communication with the processing platform to determine the subscriber feature group; and
   sending an indication of the subscriber feature group to the remote terminal.

8. A method of switching a subscriber wireline telephone call as in claim 6 wherein the call originates from the subscriber, determining the subscriber feature group comprising:
   receiving the call at the remote terminal; and
   querying a processing platform from the remote terminal to determine the subscriber feature group.

9. A method of switching a subscriber wireline telephone call as in claim 6 wherein the call is to the subscriber, determining the subscriber feature group comprising:
   receiving the call at one of the switches;
   querying an intelligent control point from the switch receiving the call; and
   querying a processing platform from the intelligent control point to determine the subscriber feature group.

10. A system for connecting a subscriber wireline telephone comprising:
    a plurality of telecommunications switches, each switch having a plurality ports, each port grouped into one of a plurality of feature groups based on subscriber wireline telephone services provisioned in the switch;
    a remote terminal in communication with the wireline telephone, the remote terminal connected to each port through a digital loop carrier, the remote terminal operative to connect the subscriber wireline telephone to one of the switch ports;
    a database indicating a subscriber feature group implementing wireline telephone services to which the subscriber subscribes; and
    a processing platform in communication with the database and the remote terminal, the processing platform determining the subscriber feature group based on a subscriber identification number;
    wherein the remote terminal connects the subscriber wireless telephone to one of the switch ports grouped into the subscriber feature group.

11. A system for connecting a subscriber wireline telephone as in claim 10 wherein the remote terminal is further operative to receive a call placed by the subscriber wireline telephone and to query the processing platform for the subscriber feature group.

12. A system for connecting a subscriber wireline telephone as in claim 10 wherein a call destined for the subscriber wireline telephone is received by one of the switches, the system further comprising an intelligent service control point in communication with the switches and the remote terminal, the intelligent service control point operative to receive the subscriber identification number from the switch receiving the call and to query the processing platform for the subscriber feature group.

13. A system for connecting a subscriber wireline telephone as in claim 10, wherein the processing platform provides specific parameters directing the remote terminal to select a specific switch and port from a specific group of ports based on predetermined parameters and if that port and switch are unavailable, the processing platform assigns the call to a different switch based on other predetermined parameters; wherein the predetermined parameters comprise the user selected feature groups and the other predetermined parameters comprise predetermined data.

\* \* \* \* \*